United States Patent

Refior et al.

[11] Patent Number: 5,810,444
[45] Date of Patent: Sep. 22, 1998

[54] SEAT LATCH BLOCKOUT MECHANISM

[75] Inventors: Lawrence M. Refior, St. Clair; Robert J. Desmarais, Almont; Michael J. Moore, Imlay City; Blair Morrison, Rochester Hills; Martin Berthiaume, Sterling Heights, all of Mich.

[73] Assignee: TRW Vehicle Safety Systems Inc., Lyndhurst, Ohio

[21] Appl. No.: 882,547

[22] Filed: Jun. 25, 1997

Related U.S. Application Data

[63] Continuation of Ser. No. 572,002, Dec. 14, 1995.
[51] Int. Cl.$^6$ ........................................................ B60N 2/20
[52] U.S. Cl. .............................. 297/378.12; 297/378.13
[58] Field of Search .......................... 297/378.12, 378.11, 297/378.13

[56] References Cited

U.S. PATENT DOCUMENTS

| | | | |
|---|---|---|---|
| 3,632,168 | 1/1972 | Barello et al. | 297/378.12 |
| 3,655,240 | 4/1972 | DuRocher et al. | 297/378.12 |
| 3,792,898 | 2/1974 | Lindbert | 297/378.12 X |
| 4,132,447 | 1/1979 | Terada . | |
| 4,268,086 | 5/1981 | Okuyama . | |
| 4,394,048 | 7/1983 | Sakurai et al. | 297/378.12 X |
| 4,484,779 | 11/1984 | Suzuki . | |
| 4,874,205 | 10/1989 | Arefinejad et al. | 297/378.12 |
| 4,919,482 | 4/1990 | Landis et al. | 297/378.11 |
| 5,383,707 | 1/1995 | Osenkowski et al. | 297/378.12 X |
| 5,390,980 | 2/1995 | Premji et al. | 297/378.11 X |

FOREIGN PATENT DOCUMENTS

| | | | |
|---|---|---|---|
| 195930 | 10/1986 | European Pat. Off. | 297/378.12 |
| 2306102 | 10/1976 | France | 297/378.12 |
| 1555736 | 4/1970 | Germany | 297/378.12 |
| 2754815 | 6/1979 | Germany | 297/378.12 |
| 2806771 | 8/1979 | Germany | 297/378.12 |
| 3611929 | 10/1987 | Germany | 297/378.12 |
| 7134340 | 8/1982 | Japan | 297/378.12 |
| 8036734 | 3/1983 | Japan | 297/378.12 |

*Primary Examiner*—Peter M. Cuomo
*Assistant Examiner*—David E. Allred
*Attorney, Agent, or Firm*—Tarolli, Sundheim, Covell, Tummino & Szabo

[57] ABSTRACT

A latch mechanism latches a seat back (40), which is moveable relative to a seat base (20) between an upright position and a folded position. The latch mechanism comprises a pawl (60) connected with the seat back (40). The pawl (60) is moveable relative to the seat back (40) between an engaged position in which the pawl (60) is effective to prevent movement of the seat back (40) from the upright position and a disengaged position in which the pawl (60) is ineffective to prevent movement of the seat back (40) from the upright position. The latch mechanism further comprises a retaining member (100) connected with the seat back (40). The retaining member (100) is moveable from a first position to a second position upon movement of the seat back from the upright position. The retaining member (100) is effective to retain the pawl (60) against movement to the engaged position relative to the seat back (40) when the retaining member (100) is in the second position.

32 Claims, 4 Drawing Sheets

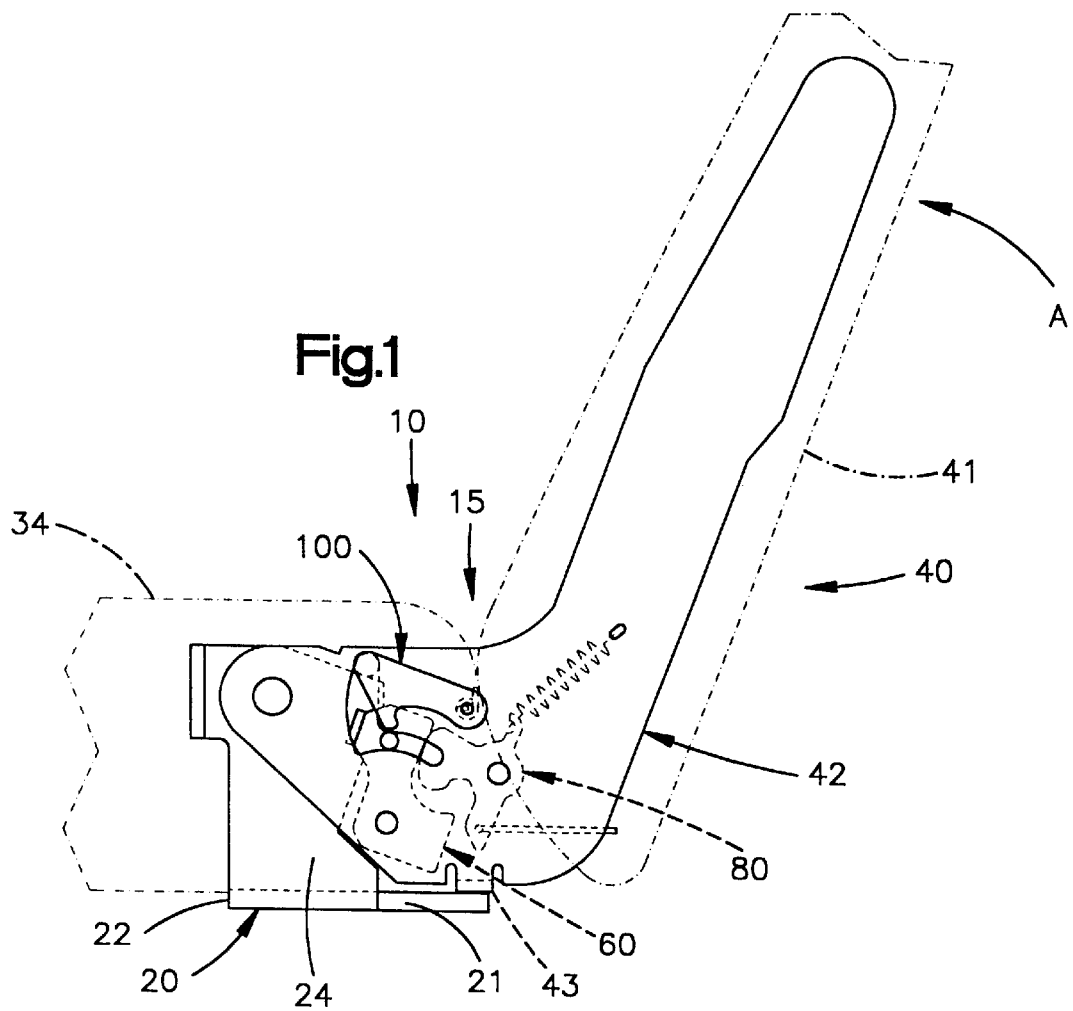
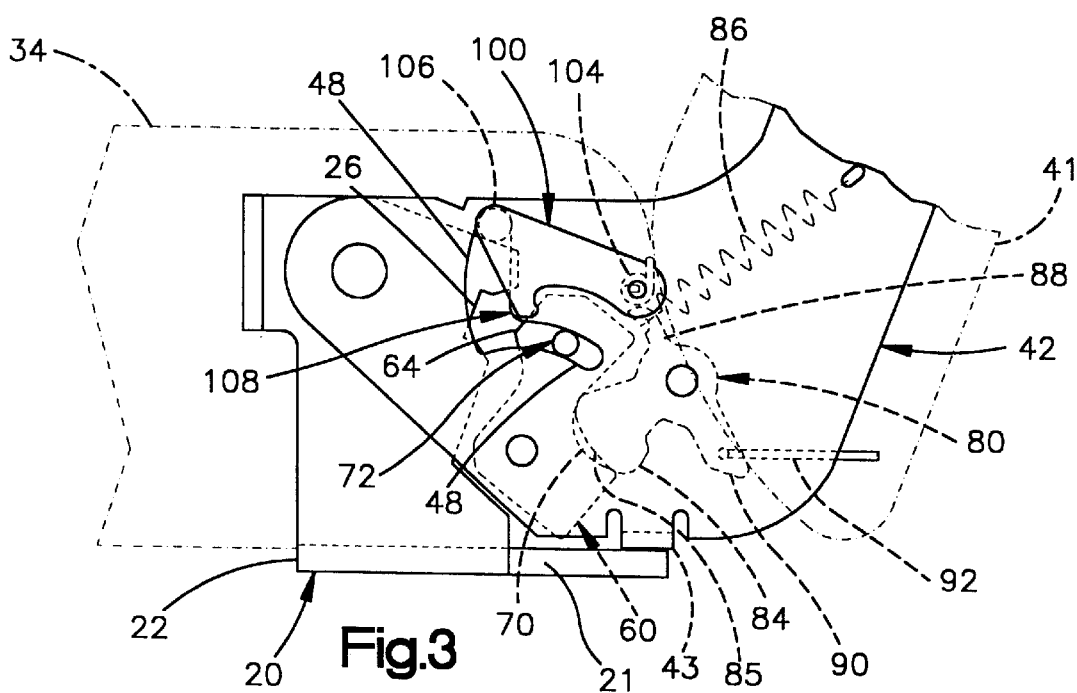

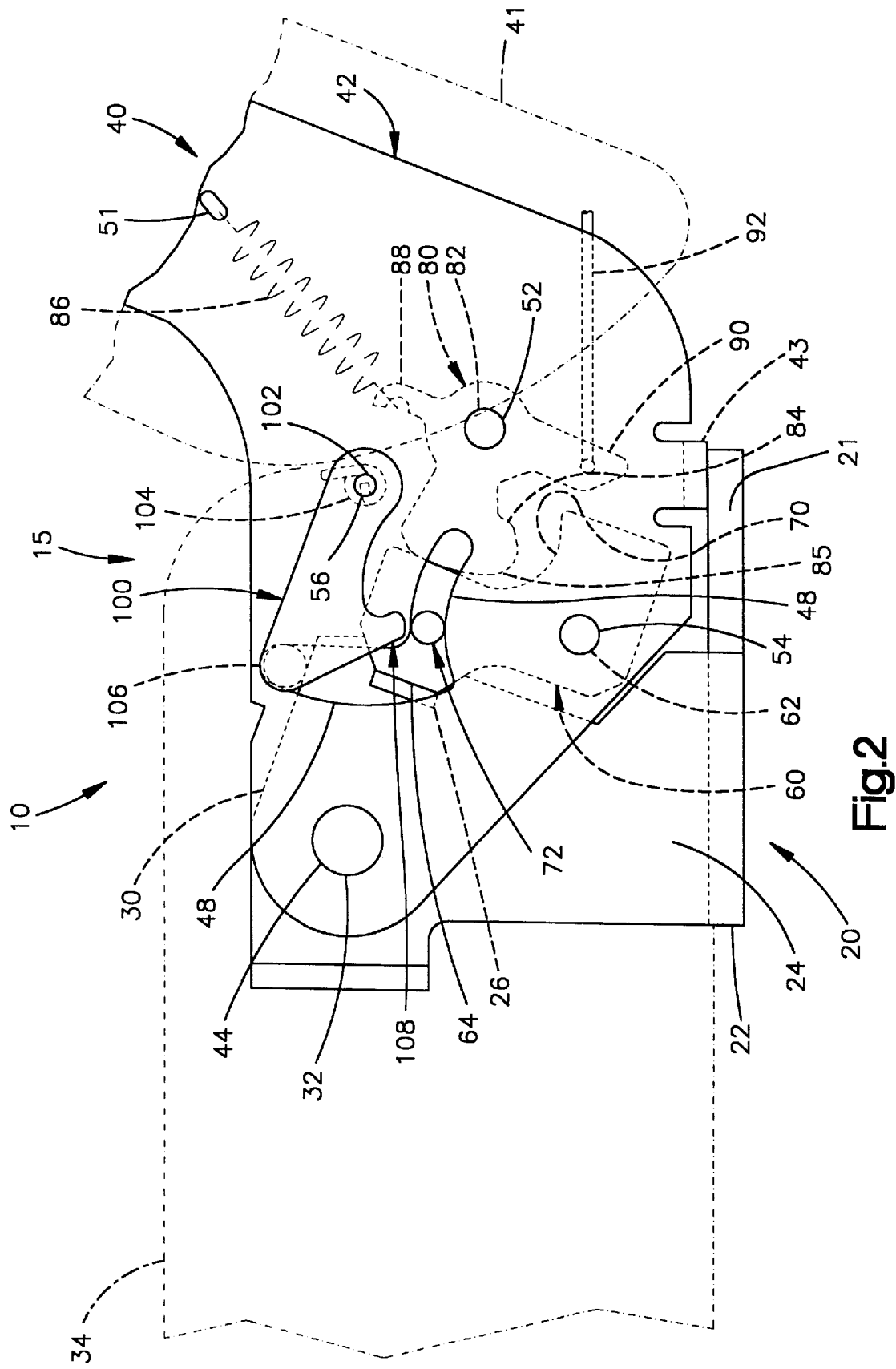

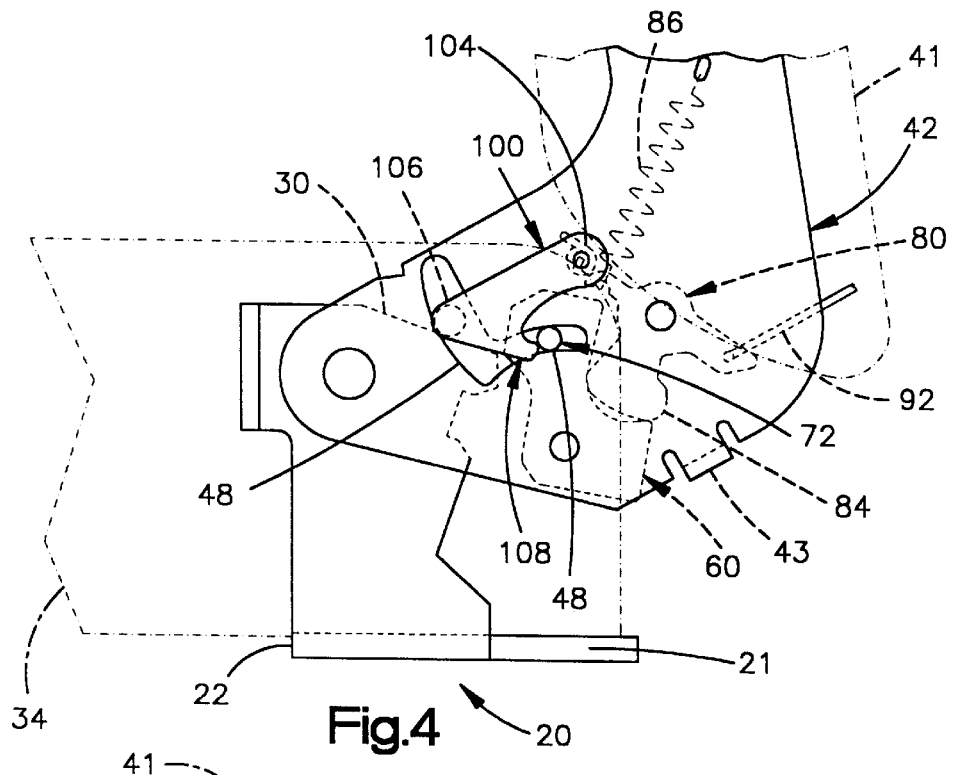
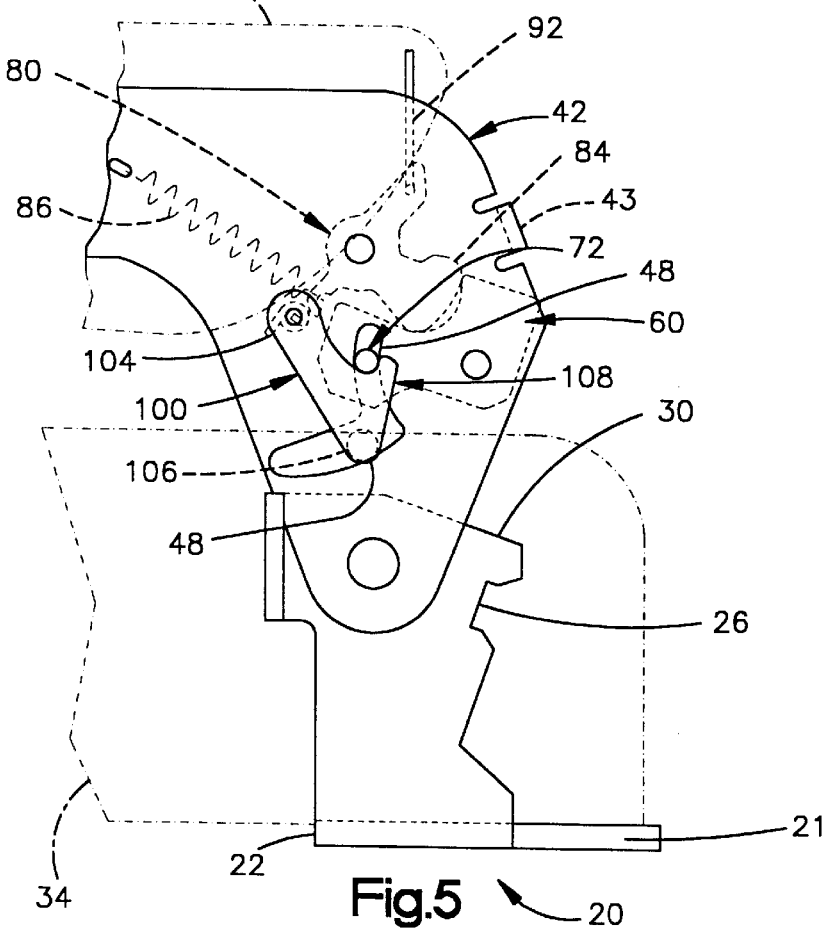

SEAT LATCH BLOCKOUT MECHANISM

This application is a continuation of copending application Ser. No. 08/572,002 filed on Dec. 14, 1995.

BACKGROUND OF THE INVENTION

1. Technical Field

The present invention relates to a latch mechanism for a seat back which is moveable relative to a seat base between an upright position and a folded position, and more specifically, relates to a seat back latch mechanism having an unlocked condition allowing the seat back to move between the upright position and the folded position and a locked condition locking the seat back in the upright position.

2. Description of the Prior Art

A vehicle seat includes a seat back and a seat base. The vehicle seat is constructed to enable the seat back to be moved relative to the seat base between an upright position and a folded position. The vehicle seat includes a latch mechanism which locks the seat back in the upright position. The latch mechanism includes a pawl which is connected to the seat back and is engageable with a detent surface on the seat base to lock the seat back in the upright position. A manually operated handle is commonly used to move the pawl out of engagement with the seat base detent surface to allow the seat back to move relative to the seat base. Thus, when the pawl is out of engagement with the seat base detent surface, the seat back can be moved from the upright position to the folded position.

A problem encountered with a latch mechanism for a seat back is unwanted engagement of the latch mechanism while the seat back is moving relative to the seat base. The prior art solves this problem by using a cam surface on the seat base to block the pawl from engaging the seat base detent surface while the seat back is moving relative to the seat base. The cam surface increases the height of the seat base and the height of the vehicle seat when the seat back is in the folded position. Thus, when a vehicle seat with such a cam surface is folded, it occupies more space in the passenger compartment of the vehicle as compared to a folded vehicle seat without such a cam surface.

SUMMARY OF THE INVENTION

The present invention is a latch mechanism for a seat back. The seat back is moveable relative to a seat base between an upright position and a folded position. The latch mechanism locks the seat back in the upright position and includes a pawl mounted on the seat back. The pawl is moveable relative to the seat back between an engaged position and a disengaged position. When the pawl is in the engaged position, the pawl prevents the movement of the seat back from the upright position. When the pawl is in the disengaged position, the pawl is unable to prevent the movement of the seat back from the upright position. An actuator member is mounted on the seat back to move the pawl between the engaged and the disengaged positions. A retaining member is mounted on the seat back and is moveable relative to the seat back between a first position and a second position. The retaining member is moveable from the first position to the second position upon movement of the seat back from the upright position. The retaining member is effective to retain the pawl against movement to the engaged position relative to the seat back when the retaining member is in the second position.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein:

FIG. 1 is a partially cut away schematic side view of a vehicle seat illustrating a seat back of the vehicle seat in an upright position;

FIG. 2 is a partially cut away view of FIG. 1 illustrating a latch mechanism for latching the seat back in the upright position as shown in FIG. 1;

FIGS. 3–5 are partially cut away schematic side views similar to FIG. 2 and illustrating parts of the latch mechanism in different positions.

DESCRIPTION OF PREFERRED EMBODIMENT

Figure 6:
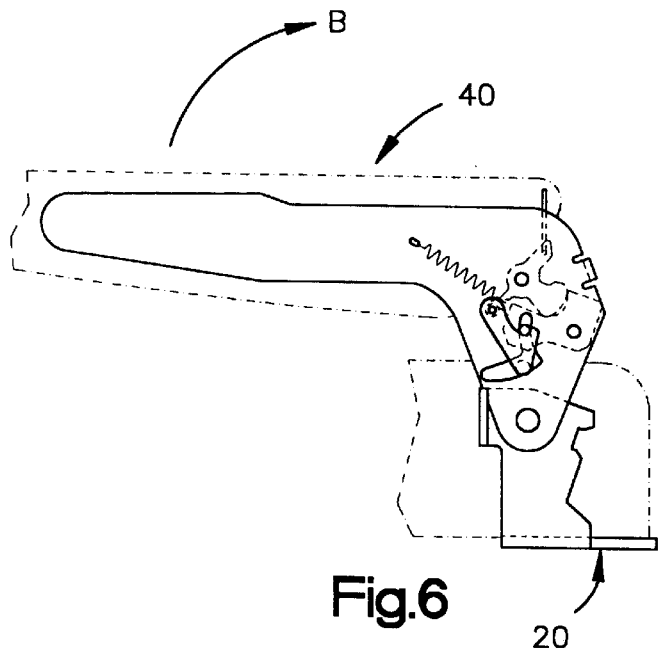
FIGS. 6–8 are partially cut away schematic side views of the vehicle seat, as shown in FIG. 1, illustrating the seat back of the vehicle seat in different positions.

FIG. 1 illustrates a vehicle seat 10 for an occupant of a vehicle and includes a seat base 20 and a seat back 40. The seat base 20 is U-shaped and includes a bottom 21 and left and right sides (only left side 24 and bottom 21 of the seat base 20 are shown in FIG. 1). The seat base left and right sides are connected with left and right edges of the seat base bottom 21 respectively and extend perpendicular to the seat base bottom. The seat base bottom 21 is attached to the floor of the vehicle and includes an edge 22 facing in the direction the vehicle travels forward. The seat base left and right sides include inner and outer surfaces with the inner surface of the seat base left side 24 facing the inner surface of the seat base right side. The outer surface of the seat base left side 24 faces a left side of the vehicle while the outer surface of the seat base right side faces a right side of the vehicle. A seat base cushion 34 covers the seat base 20 to provide a seat for the occupant of the vehicle.

The seat back 40, as seen in FIG. 1, includes a seat back frame (not shown) and left and right support plates of identical construction (only the left support plate 42 is shown in FIG. 1). The seat back frame is disposed between and connected with the left and right support plates.

An inner surface of the left support plate 42 extends parallel to an inner surface of the right support plate and faces the outer surface of the seat base left side 24. The inner surface of the right support plate faces the outer surface of the seat base right side. The left and right support plates include outer surfaces with the outer surface of the left support plate 42 facing the left side of the vehicle and the outer surface of the right support plate facing in the opposite direction toward the right side of the vehicle. The left and right support plates also include stop tongues (only the left support plate stop tongue 43 is shown in FIG. 1). The left support plate stop tongue 43 extends transversely from the left support plate 42 towards the right side of the vehicle while the right support plate stop tongue extends transversely from the right support plate towards the left side of the vehicle. The left and right support plate stop tongues engage the seat base bottom 21 when the seat back 40 is in the upright position of FIG. 1. The seat back 40 further includes a cushion 41 connected to the seat back frame.

The left support plate 42 and the right support plate are connected to the seat base 20 for pivotal movement relative to the seat base. Only the connection of the left support plate 42 to the seat base 20 will be described herein. The right support plate is connected to the seat base 20 in the same manner as the left support plate 42, and thus, the connection of the right support plate to the seat base will not be described.

Referring to FIG. 2, the left support plate 42 includes a circular opening 44 defined by a surface of the left support plate 42. A seat base pin 32 is fixed to the seat base left side 24 and extends into the opening 44 to support the left support plate 42 for pivotal movement relative to the seat base 20. The pivotal connection of the left and right support plates to the seat base 20 enables the seat back 40 to pivot relative to the seat base between an upright position, as seen in FIG. 1, and a folded position, as seen in FIG. 6.

Referring to FIG. 1, the vehicle seat 10 includes a latch mechanism 15 to block the movement of the seat back 40 from the upright position. The latch mechanism 15 may be mounted to either the left support plate 42 or the right support plate. The mounting of the latch mechanism 15 to the left support plate 42 is illustrated and described herein.

Referring to FIG. 2, the latch mechanism 15 includes a pawl 60. The pawl 60 includes a circular opening 62 which is defined by a surface of the pawl. A pawl mounting pin 54 is fixed to the left support plate 42 and extends transversely from the left support plate toward the right side of the vehicle. The pawl mounting pin 54 extends into the opening 62 and supports the pawl 60 for pivotal movement relative to the left support plate 42. The pawl 60 is pivotable relative to the left support plate 42 between a latched position shown in FIG. 2 and an unlatched position shown in FIG. 3.

The pawl 60 has a detent nose 64 as seen in FIG. 2. The detent nose 64 of the pawl 60 is receivable in a seat base recess or groove 26 defined by a surface on the seat base 20. When the pawl 60 is in the latched position shown in FIG. 2, the detent nose 64 of the pawl 60 is in the seat base recess or groove 26 to latch the seat back 40 in its upright position as illustrated in FIG. 1. When the pawl 60 is in the unlatched position shown in FIG. 3, the detent nose 64 of the pawl 60 is no longer in the seat base recess or groove 26, allowing the seat back 40 to pivot from its upright position.

As seen in FIG. 2, the pawl 60 also includes a pawl retaining pin 72. The pawl retaining pin 72 is fixed to the pawl 60 and extends transversely from the pawl toward the left side of the vehicle. The pawl retaining pin 72 extends through a slot 48 defined by an L-shaped surface of the left support plate 42. A portion of the pawl retaining pin 72 extends beyond the outer surface of the left support plate 42. The pawl retaining pin 72 is moveable relative to the slot 48 between a first retaining pin position shown in FIG. 2 and a second retaining pin position shown in FIG. 3. The pawl retaining pin 72 is in the first retaining pin position when the pawl 60 is in the latched position and the seat back 40 is in its upright position and is in the second retaining pin position when the pawl is in the unlatched position as the seat back is pivoted from its upright position.

Referring to FIG. 2, the latch mechanism 15 also includes an actuator 80. The actuator 80 includes a circular opening 82 which is defined by a surface of the actuator 80. An actuator mounting pin 52 is fixed to the left support plate 42 and extends transversely from the left support plate toward the right side of the vehicle. The actuator mounting pin 52 extends into the opening 82 and supports the actuator 80 for rotational movement relative to the left support plate 42. The actuator 80 is rotatable relative to the left support plate 42 between a position shown in FIG. 2 and a position shown in FIG. 3.

The actuator 80 includes an actuator arm 84 which extends from the actuator toward the pawl 60. The actuator arm 84 includes a cam surface 85 which engages a cam surface 70 on the pawl 60. When the actuator 80 is rotated relative to the left support plate 42 between the position shown in FIG. 2 and the position shown in FIG. 3, the actuator arm cam surface 85 moves relative to the pawl cam surface 70 to pivot the pawl 60 between the latched and unlatched positions.

The actuator 80 has a spring attachment arm 88 which extends from the actuator 80 to engage a first end of a tension spring 86. A second end of the tension spring 86 is received in a spring mounting opening 51. The spring mounting opening 51 is defined by a surface of the left support plate 42. The tension spring 86 acts between the left support plate 42 and the actuator 80 and urges the actuator 80 to rotate from the position shown in FIG. 3 to the position shown in FIG. 2.

The actuator 80 also includes a cable attachment arm 90 which extends from the actuator 80 to engage a first end of a cable 92. A second end of the cable 92 engages a handle (not shown). Upon operation of the handle, the cable 92 rotates the actuator 80 against the force of the tension spring 86 from the position shown in FIG. 2 to the position shown in FIG. 3. The handle is connected to the seat back frame and extends so as to be manually operable by an occupant of the vehicle.

The latch mechanism 15 further includes a pawl retaining member 100 as shown in FIG. 2. The pawl retaining member 100 includes a circular opening 102 which is defined by a surface of the pawl retaining member. A pawl retaining member mounting pin 56 is fixed to the left support plate 42 and extends transversely from the left support plate toward the left side of the vehicle. The pawl retaining member mounting pin 56 extends into the opening 102 and supports the pawl retaining member 100 for pivotal movement relative to the left support plate 42. The pawl retaining member 100 is pivotable relative to the left support plate 42 between a position shown in FIG. 2 and positions shown in FIGS. 4 and 5.

The pawl retaining member 100 has a pawl retaining arm 108. The pawl retaining arm 108 is engageable with the pawl retaining pin 72 to hold the pawl retaining pin in the second retaining pin position and the pawl 60 in the unlatched position. The pawl retaining arm 108 engages the pawl retaining pin 72 when the pawl retaining member 100 is in the positions shown in FIGS. 4 and 5.

As seen in FIG. 2, a torsion spring 104 is disposed between the pawl retaining member 100 and the left support plate 42. The longitudinal central axis of the pawl retaining member mounting pin 56 is coincident with the central axis of the torsion spring 104. A first end of the torsion spring 104 engages the pawl retaining member 100 while a second end of the torsion spring 104 engages the left support plate 42. The torsion spring 104 acts between the pawl retaining member 100 and the left support plate 42 and urges the pawl retaining member to pivot from the position shown in FIG. 2 to the position shown in FIG. 5.

A pawl retaining member cam pin 106 is fixed to the pawl retaining member 100 and extends transversely from the pawl retaining member through the slot 48 toward the right side of the vehicle. The pawl retaining member cam pin 106 extends beyond the inner surface of the left support plate 42 and is engageable with a cam surface 30 on the seat base 20. When the seat back 40 is in its upright position, the seat base cam surface 30 and the pawl retaining member cam pin 106 engage to block the movement of the pawl retaining member 100 under the bias of torsion spring 104 from the position shown in FIG. 2 to the position shown in FIG. 5.

The operation of the latch mechanism 15 for the seat back 40 will now be described. To pivot the seat back 40 from the upright position to the folded position, the occupant actuates the handle (not shown) to rotate the actuator 80 against the bias of tension spring 86 from the position shown in FIG. 2 to the position shown in FIG. 3. As the actuator 80 rotates, the actuator arm cam surface 85 and the pawl cam surface 70 will move relative to one another to pivot the pawl 60 from the latched position shown in FIG. 2 to the unlatched position shown in FIG. 3. As the pawl 60 is pivoted to the unlatched position, the pawl retaining pin 72 is moved to the second retaining pin position and the detent nose 64 of the pawl 60 is moved out of the seat base recess or groove 26 to allow the seat back 40 to pivot relative to the seat base 20.

Next, the occupant pushes the seat back 40 in the direction of arrow A, as seen in FIG. 1, to pivot the seat back from its upright position to its folded position. As the seat back 40 pivots from the upright position, the relative motion of the seat base cam surface 30 and the pawl retaining member cam pin 106 allows the torsion spring 104 to pivot the pawl retaining member 100 from the position shown in FIG. 2 to the positions shown in FIGS. 4 and 5. As the pawl retaining member 100 pivots toward the position shown in FIG. 5, the pawl retaining arm 108 moves into engagement with the pawl retaining pin 72 to hold the pawl retaining pin in the second retaining pin position and the pawl 60 in the unlatched position. The occupant then releases the handle (not shown) and continues pushing the seat back 40 until the seat back is in the folded position as seen in FIG. 6.

Figure 7:
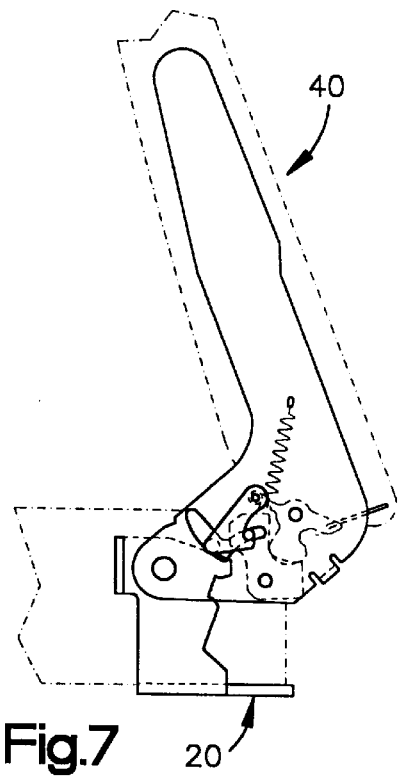
Figure 8:
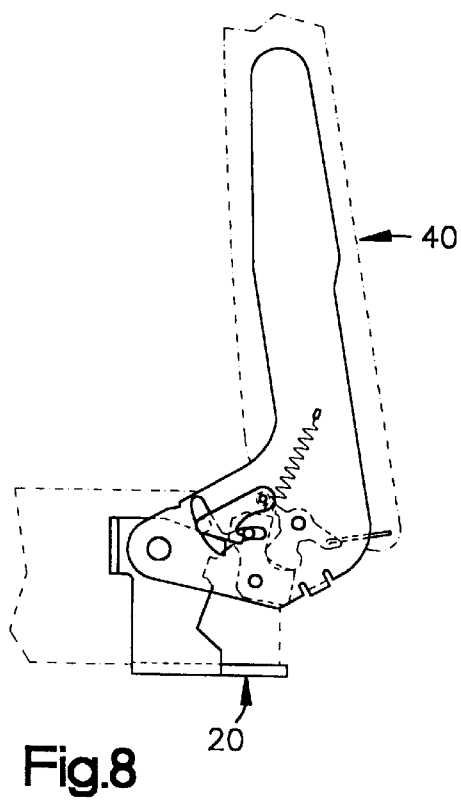

To return the seat back 40 to the upright position, the occupant pushes the seat back in the direction of arrow B as seen in FIG. 6. As the seat back 40 pivots toward the upright position as shown in FIGS. 7 and 8, the relative motion of the seat base cam surface 30 and the pawl retaining member cam pin 106 causes the pawl retaining member cam pin to engage the seat base cam surface and pivot the pawl retaining member 100 against the bias of torsion spring 104 from the position shown in FIG. 5 to the position shown in FIG. 2. As the pawl retaining member 100 is pivoted to the position shown in FIG. 2, the pawl retaining arm 108 is moved out of engagement with the pawl retaining pin 72 to allow the pawl 60 to pivot to the latched position shown in FIG. 2.

Once the pawl retaining arm 108 is moved out of engagement with the pawl retaining pin 72, the tension spring 86 rotates the actuator 80 from the position shown in FIG. 3 to the position shown in FIG. 2. As the actuator 80 rotates, the actuator arm cam surface 85 and the pawl cam surface 70 will move relative to one another to pivot the pawl 60 from the unlatched position shown in FIG. 3 to the latched position shown in FIG. 2. As the pawl 60 is pivoted to the latched position, the pawl retaining pin 72 is moved from the second retaining pin position to the first retaining pin position and the detent nose 64 of the pawl 60 is received in the seat base recess or groove 26 to block movement of the seat back 40 relative to the seat base 20.

From the above description of the invention, those skilled in the art will perceive improvements, changes and modifications. Such improvements, changes and modifications within the skill of the art are intended to be covered by the appended claims.

Having described the invention, we claim the following:

1. A latch mechanism for locking a seat back in an upright position relative to a seat base, the seat back being movable relative to the seat base between the upright position and a folded position, said mechanism comprising:

a pawl member preventing movement of the seat back from the upright position by selectively engaging the fixed portion of the seat base in an engaged position with the seat back in the upright position;

means for movably mounting said pawl member on the seat back such that said pawl member moves with the seat back relative to the seat base during movement of the seat back and such that said pawl member moves relative to the seat back between the engaged position and a disengaged position in which said pawl member permits movement of the seat back from the upright position;

an actuator member selectively moving said pawl member between the engaged and disengaged positions;

means for mounting said actuator member on the seat back such that said actuator member moves with the seat back relative to the seat base during movement of the seat back, wherein said actuator member engages said pawl member and moves relative to the seat back and selectively moves said pawl member;

a retaining member for retaining said pawl member in the disengaged position by engaging said pawl member;

means for mounting said retaining member on the seat back such that said retaining member moves with the seat back relative to the seat base during movement of the seat back and such that said retaining member moves relative to the seat back and engages said pawl member and retains said pawl member in the disengaged position, when the seat back leaves the upright position; and wherein said retaining member includes a portion engaging the fixed portion of the seat base during movement of the seat back from the folded position to the upright position such that said retaining member is moved and disengaged from said pawl member when the seat back reaches the upright position.

2. A latch mechanism as set forth in claim 1, wherein said means for mounting said pawl member on the seat back includes means for pivotally mounting said pawl member such that said pawl member pivots about said means for pivotally mounting said pawl member between the engaged and disengaged positions, and said actuator member engages said pawl member to cause the pivoting of said pawl member.

3. A latch mechanism as set forth in claim 2, wherein the seat back has a planar plate portion with a slot, said means for pivotally mounting said pawl member includes means for mounting said pawl member on the planar portion such that said pawl member has a pivot axis perpendicular to the planar portion, said pawl member has a portion extending into the slot of the planar portion, and said portion of said pawl member moves along the slot between a first position and a second position as said pawl member pivots between the engaged and disengaged positions, respectively.

4. A latch mechanism as set forth in claim 3, wherein said retaining member includes a portion engaging said portion of said pawl member during movement of the seat back from the upright position to the folded position and holding said portion of said pawl member in the second position which prevents said pawl member from pivoting to the engaged position while the seat back is in the folded position.

5. A latch mechanism as set forth in claim 3, wherein said retaining member includes a portion extending into the slot and engaging the fixed portion of the seat base during movement of the seat back from the folded position to the upright position which causes said portion of said retaining member extending into the slot to move along the slot and which disengages said retaining member from said pawl member.

6. A latch mechanism as set forth in claim 1 further including a spring mechanism connected to said actuator member urging said actuator member to move said pawl member to the engaged position.

7. A latch mechanism as set forth in claim 1, wherein the fixed portion of the seat base has a cam surface, and said retaining member includes a portion for engaging the cam surface during movement of the seat beak from the folded position to the upright position such that said retaining member is moved relative to the seat back and is disengaged from said pawl member when the seat back is in the upright position.

8. A latch mechanism set forth in claim 7 further including a spring mechanism connected to said retaining member urging said retaining member to move.

9. A latch mechanism as set forth in claim 1, wherein said means for mounting said pawl member includes means for pivotally mounting said pawl member such that said pawl member pivots about said means for pivotally mounting said pawl member between the engaged and disengaged positions, said means for mounting said actuator member includes means for pivotally mounting said actuator member such that said actuator member pivots about said means for pivotally mounting said actuator member to engage and move said pawl member, and said means for mounting said retaining member includes means for pivotally mounting said retaining member such that said retaining member pivots about said means for pivotally mounting said retaining member to engage and retain said pawl member.

10. A latch mechanism as set forth in claim 9, wherein the seat back has a planar portion with a slot, said means for pivotally mounting said pawl member includes means for mounting said pawl member on the planar portion such that said pawl member has a pivot axis perpendicular to the planar portion, said pawl member has a portion extending into the slot of the planar portion, and said portion of said pawl member moves along the slot between a first position and a second position as said pawl member pivots between the engaged and disengaged positions, respectively.

11. A latch mechanism as set forth in claim 10, wherein said retaining member has a portion extending into the slot of the planar portion, and said means for pivotally mounting said retaining member includes means for mounting said retaining member on the planar portion such that said retaining member has a pivot axis perpendicular to the planar portion, said portion of said retaining member moves along the slot as said retaining member pivots, and said portion of said retaining member engages the fixed portion of the seat base during movement of the seat back from the folded position to the upright position which moves said portion of said retaining member along the slot and which disengages said retaining member from said pawl member.

12. A latch mechanism as set forth in claim 10, wherein said slot is L-shaped.

13. A latch mechanism as set forth in claim 12, wherein a portion of said L-shaped slot extends in an arc about said means for pivotally mounting said pawl member.

14. A latch mechanism as set forth in claim 10, wherein the planar portion has two parallel planar outer sides, said pawl member and said actuator member are mounted on one planar side of the planar portion, and said retaining member is mounted on the other planar side of the planar portion.

15. A latch mechanism as set forth in claim 1, wherein the fixed portion of the seat base has a detent recess, said pawl member has a nose portion, said nose portion fits into the detent recess in tight engagement when said pawl member is in the engaged position.

16. A latch mechanism as set forth in claim 1, wherein said actuator member includes a portion engaging said pawl member and blocking movement of said pawl member when said pawl member is in the engaged position.

17. A latch mechanism for locking a seat back in an upright position relative to a seat base, the seat back being movable relative to the seat base between the upright position and a folded position, said mechanism comprising:

a pawl member preventing movement of the seat back from the upright position by selectively engaging the fixed portion of the seat base in an engaged position with the seat back in the upright position;

means for movably mounting said pawl member on the seat back such that said pawl member moves with the seat back relative to the seat base during movement of the seat back and such that said pawl member moves relative to the seat back between the engaged position and a disengaged position in which said pawl member permits movement of the seat back from the upright position;

a retaining member for retaining said pawl member in the disengaged position by engaging said pawl member when the seat back is in the folded position;

means for mounting said retaining member on the seat back such that said retaining member moves with the seat back relative to the seat base during movement of the seat back and such that said retaining member moves relative to the seat back and engages and retains said pawl member when the seat back leaves the upright position; and wherein said retaining member includes a portion engaging the fixed portion of the seat base during movement of the seat back from the folded position to the upright position such that said retaining member is moved and disengaged from said pawl member when the seat back reaches the upright position.

18. A latch mechanism set forth in claim 17 further including an actuator member selectively moving said pawl member between the engaged and disengaged positions.

19. A latch mechanism as set forth in claim 18 further including means for mounting said actuator member on the seat back such that said actuator member moves with the seat back relative to the seat base during movement of the seat back, wherein said actuator engages said pawl member and moves relative to the seat back and selectively moves said pawl member, and wherein said actuator member blocks movement of said pawl member when said pawl member is in the engaged position and said actuator member is in engagement with said pawl member.

20. A latch mechanism as set forth in claim 19, wherein said means for mounting said pawl member includes means for pivotally mounting said pawl member such that said pawl member pivots about said means for pivotally mounting said pawl member between the engaged and disengaged positions, said means for mounting said actuator member includes means for pivotally mounting said actuator member such that said actuator member pivots about said means for pivotally mounting said actuator member and engages and moves said pawl member, and said means for mounting said retaining member includes means for pivotally mounting said retaining member such that said retaining member pivots about said means for pivotally mounting said retaining member and engages and retains said pawl member.

21. A latch mechanism as set forth in claim 20, wherein the seat back has a planar portion with a slot, said means for pivotally mounting said pawl member includes means for mounting said pawl member on the planar portion such that said pawl member has a pivot axis perpendicular to the planar portion, said pawl member has a portion extending into the slot of the planar portion, and said portion of said pawl member moves along the slot between a first position and a second position as said pawl member pivots between the engaged and disengaged positions, respectively.

22. A latch mechanism as set forth in claim 21, wherein a portion of said retaining member extends into the slot of the planar portion, and said means for pivotally mounting said retaining member includes means for mounting said retaining member on the planar portion such that said retaining member has a pivot axis perpendicular to the planar portion, said portion of said retaining member moves along the slot as said retaining member pivots, and said portion of said retaining member engages the fixed portion of the seat base during movement of the seat back from the folded position to the upright position which moves said portion of said retaining member along the slot and which disengages said retaining member from said pawl member.

23. A latch mechanism as set forth in claim 21, wherein the slot is L-shaped, said portion of said pawl member extending into the slot moves along one portion of the slot, said portion of said retaining member extending into the slot moves along another portion of the slot.

24. A latch mechanism as set forth in claim 23, wherein the portion of the slot along which said portion of said pawl member moves extends in an arc about said means for pivotally mounting said pawl member.

25. A latch mechanism as set forth in claim 21, wherein the planar portion has two parallel planar outer sides, said pawl member and said actuator member are mounted on one planar side of the planar portion, and said retaining member is mounted on the other planar side of the planar portion.

26. A latch mechanism as set forth in claim 19 further including a spring mechanism connected to said actuator member urging said actuator member to move said pawl member to the engaged position.

27. A latch mechanism as set forth in claim 17, wherein said pawl member includes a projection which has a path of travel as said pawl member moves relative to the seat back, said retaining member includes a projection engaging portion for engaging said projection of said pawl member to retain said pawl member in the disengaged position, said projection engaging portion of said retaining member moves from a location out of the path of travel of said projection of said pawl member to a location in the path of travel of said projection and engages said projection.

28. A latch mechanism as set forth in claim 17, wherein said means for mounting said pawl member on the seat back includes means for pivotally mounting said pawl member such that said pawl member pivots about said means for pivotally mounting said pawl member between the engaged and disengaged positions.

29. A latch mechanism as set forth in claim 28, wherein the seat back has a planar plate portion with a slot, said means for pivotally mounting said pawl member includes means for mounting said pawl member on the planar portion such that said pawl member has a pivot axis perpendicular to the planar portion, said pawl member has a portion extending into the slot of the planar portion, said portion of said pawl member moves along the slot between a first position and a second position as said pawl member pivots between the engaged and disengaged positions, respectively.

30. A latch mechanism as set forth in claim 29, wherein said retaining member includes a portion engaging said portion of said pawl member extending into the slot during movement of the seat back from the upright position to the folded position and holding said portion of said pawl member in the second position which prevents said pawl member from pivoting to the engaged position while the seat back is in the folded position.

31. A latch mechanism as set forth in claim 29, wherein said portion of said retaining member engaging the fixed portion of the seat base extends into the slot, and during movement of the seat back from the folded position to the upright position said portion of said retaining member in the slot moves along the slot.

32. A latch mechanism as set forth in claim 17 further including a spring mechanism connected to said retaining member and urging said retaining member to move.

* * * * *